(12) United States Patent
Fatemi et al.

(10) Patent No.: US 12,015,331 B2
(45) Date of Patent: Jun. 18, 2024

(54) ELECTRIC MOTOR ROTOR WITH CONFORMAL HEAT PIPES

(71) Applicant: GM GLOBAL TECHNOLOGY OPERATIONS LLC, Detroit, MI (US)

(72) Inventors: Alireza Fatemi, Canton, MI (US); Chih-hung Yen, Bloomfield Hills, MI (US); SeungHwan Keum, Northville, MI (US); Farzad Samie, Franklin, MI (US); Thomas W Nehl, Shelby Township, MI (US); Taeyoung Han, Bloomfield Hills, MI (US); Ronald O Grover, Jr., Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 316 days.

(21) Appl. No.: 17/647,049

(22) Filed: Jan. 5, 2022

(65) Prior Publication Data

US 2023/0216379 A1    Jul. 6, 2023

(51) Int. Cl.
*H02K 9/22* (2006.01)
*H02K 1/276* (2022.01)
*H02K 9/20* (2006.01)

(52) U.S. Cl.
CPC ............ *H02K 9/225* (2021.01); *H02K 1/276* (2013.01); *H02K 9/20* (2013.01)

(58) Field of Classification Search
CPC ........... H02K 9/225; H02K 1/276; H02K 9/20
See application file for complete search history.

(56) References Cited

U.S. PATENT DOCUMENTS

| 3,801,843 | A |  | 4/1974 | Corman et al. |
| 9,515,536 | B2 | * | 12/2016 | Büttner ................ H02K 17/165 |
| 10,804,755 | B2 |  | 10/2020 | Channapatana |
| 11,043,876 | B2 |  | 6/2021 | Bodla et al. |
| 2014/0132094 | A1 | * | 5/2014 | Chamberlin ......... H02K 1/2766 |
|  |  |  |  | 29/598 |
| 2015/0137632 | A1 | * | 5/2015 | Takahashi ................ H02K 1/28 |
|  |  |  |  | 310/216.106 |
| 2019/0280565 | A1 | * | 9/2019 | Kitahara ................... H02K 1/32 |
| 2021/0091630 | A1 | * | 3/2021 | Lahr ....................... H02K 1/276 |
| 2021/0281148 | A1 | * | 9/2021 | Lambourg ............. H02K 1/276 |

FOREIGN PATENT DOCUMENTS

WO    O2011032887 A1    3/2011

* cited by examiner

*Primary Examiner* — Tulsidas C Patel
*Assistant Examiner* — Mohammed Ahmed Qureshi
(74) *Attorney, Agent, or Firm* — Lorenz & Kopf LLP

(57) ABSTRACT

A rotor for an electric machine includes a heat pipe cooling system. A rotor core has a number of cavities internal to the rotor core. The cavities are surrounded by a wall defined by the rotor core. A magnetic element disposed in the at least one cavity leaving a void in the at least one cavity between the magnetic element and the wall. A heat pipe evaporator is disposed in the void and conforms to the available space, contacting the magnetic element and the wall to remove heat from the rotor core.

20 Claims, 6 Drawing Sheets

ELECTRIC MOTOR ROTOR WITH CONFORMAL HEAT PIPES

INTRODUCTION

The present invention relates to electric machines and rotors thereof, and more particularly relates to a rotor with a multitude of internal cavities, some of which may house heat pipes targeted to remove heat from the rotor's core.

A rotor, such as for an interior permanent magnet (IPM) machine or a synchronous reluctance (SR) machine, includes a rotor core assembled around the rotation shaft. These rotors may have a segmental construction that includes a number of stacked laminations forming a core body. The core body may include internal cavities as flux barriers to influence operational characteristics of the machine. The laminations of the core body are formed in a disc shape with a center opening for assembly on the rotation shaft. The flux barriers are distributed around the shaft opening, typically have ends adjacent to the circumference of the lamination, and may extend toward the shaft. The flux barrier cavities may or may not contain magnets or conductors/coils.

Cooling of electric motors may be desirable because temperature rises may affect motor performance and component longevity. In addition, motor efficiency may decrease as temperature increases. Therefore, an optimal cooling system design to improve thermal management may increase the longevity, performance, and reliability of the motor. For example, rotor losses may result in heat generation inside the rotor. Removing the heat from the moving rotor to avoid high operating temperatures of its components is more challenging than removing the heat from the non-rotating stator, especially at high rotor operating speeds.

The physical dimensions, number, and positioning of the flux barrier cavities influence the performance of an electric machine. Lamination features such as the cavities and their structural features may affect operational parameters such as the speeds achievable by the electric machine without overly stressing the rotor core. Accordingly, rotor cavities are designed to achieve specific performance objectives, and modifying or adding cavities to change that design is not preferred.

High rotor operating temperature are desirably avoided to deliver optimal performance, efficiency and the durability of an electrical motor. Accordingly, it is desirable to provide economical rotors for electric machines that achieve high performance with efficient cooling systems. Furthermore, other desirable features and characteristics of the present invention will become apparent from the subsequent detailed description and the appended claims, taken in conjunction with the accompanying drawings and the foregoing technical field and background.

SUMMARY

In various embodiments, a rotor for an electric machine includes a heat pipe cooling system. The rotor includes a rotor core having at least one cavity internal to the rotor core. The at least one cavity is surrounded by a wall defined by the rotor core. A magnetic element is disposed in the cavity leaving a void in the cavity between the magnetic element and the wall. A heat pipe evaporator is disposed in the void and contacts the magnetic element and the wall to remove heat from the rotor core.

In a number of embodiments, the magnetic element comprises a magnet.

In a number of embodiments, an end ring is disposed on the rotor core, the heat pipe evaporator is coupled with the end ring as a condenser, and the end ring is configured to retain and support the rotor core.

In a number of embodiments, the heat pipe evaporator comprises a case configured with a shape to effect capillary action through a centrifugal force generated by rotation of the rotor.

In a number of embodiments, the shape comprises at least one of tapered, twisted and arched.

In a number of embodiments, cavity comprises one cavity, the rotor core includes two axial ends, the heat pipe evaporator comprises a first heat pipe evaporator that extends into the rotor core from a first of the two axial ends and a second heat pipe evaporator extends into the rotor core from a second of the two axial ends, and both of the first heat pipe evaporator and the second heat pipe evaporator extend into the one cavity.

In a number of embodiments, the heat pipe evaporator is configured to conform to the void and to lock into the rotor core to reinforce the rotor.

In a number of embodiments, an end ring is disposed on the rotor core. The heat pipe evaporator is coupled with the end ring as a condenser. The end ring includes an outer surface with a dam forming a step, and the rotor has a liquid cooling system configured to direct liquid over the outer surface and over the dam to cool the condenser.

In a number of embodiments, a liquid cooling system is provided for cooling the rotor core, wherein the liquid cooling system includes a pump configured with a controller to reduce fluid pumping for optimal efficiency while the heat pipe evaporator removes heat from the rotor core.

In a number of embodiments, an end ring is included on the rotor core. The heat pipe evaporator is coupled with the end ring as a condenser, and the heat pipe evaporator and the end ring forming a unitary assembly prior to inserting into the rotor core.

In additional embodiments, a rotor for an electric machine includes a shaft and a rotor core disposed on the shaft. The rotor core has a plural number of cavities internal to the rotor core, each one of the cavities defined by the rotor core forming walls of each cavity, the cavities configured as flux barriers to provide desirable magnetic properties of the rotor core. A magnetic element is disposed in at least some of the cavities leaving a void in each between the magnetic element and the wall. A heat pipe evaporator is disposed in at least some of the voids and contacts the respective magnetic element and the wall to remove heat from the rotor core. An end ring is disposed on the shaft and supports the rotor core, the end ring coupled with each of the heat pipe evaporators as a condenser.

In a number of embodiments, the magnetic elements comprise permanent magnets.

In a number of embodiments, the heat pipe evaporators each comprise a case configured with a shape to effect capillary action through a centrifugal force generated by rotation of the rotor.

In a number of embodiments, the shape comprises at least one of tapered, twisted and arched, and is configured to impart liquid flow through one part of the heat pipe evaporators and to impart vapor flow through another part of the heat pipe evaporators.

In a number of embodiments, the rotor core includes two axial ends, and the heat pipe evaporators comprise a first set that extends into the rotor core from a first of the two axial ends and a second set that extends into the rotor core from a second of the two axial ends.

In a number of embodiments, the heat pipe evaporators are configured to conform to the void and to lock into the rotor core to reinforce the rotor by means of being positioned within the voids.

In a number of embodiments, the end ring includes an outer surface with a dam forming a step, wherein the rotor has a liquid cooling system configured to direct liquid over the outer surface and over the dam to cool the condenser.

In a number of embodiments, a liquid cooling system is provided for cooling the rotor core. The liquid cooling system includes a pump configured with a controller to reduce fluid pumping with the heat pipe evaporator to remove heat from the rotor core and to increase pumping when additional cooling is required.

In a number of embodiments, the cavities are distributed around the rotor core in sets, wherein each of the sets includes a radially outer layer of cavities and a radially inner layer of cavities, and wherein the heat pipe evaporators are disposed in the radially inner layer of cavities at radially innermost ends of the radially inner layer of cavities.

In other embodiments, a rotor for an electric machine includes a shaft and a rotor core disposed on the shaft. The rotor core has a plural number of cavities internal to the rotor core, each one of the cavities defined by walls formed by the rotor core, the cavities configured as flux barriers to provide desirable magnetic properties of the rotor core. A magnetic element is disposed in at least some of the cavities leaving a void in each between the respective magnetic element and the walls. A heat pipe evaporator is disposed in at least some of the voids and contacts the magnetic element and the wall to remove heat from the rotor core. An end ring is disposed on the shaft and supports the rotor core. The end ring is coupled with each of the heat pipe evaporators as a condenser. The condenser and the heat pipe evaporators form a unitary subassembly unit.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
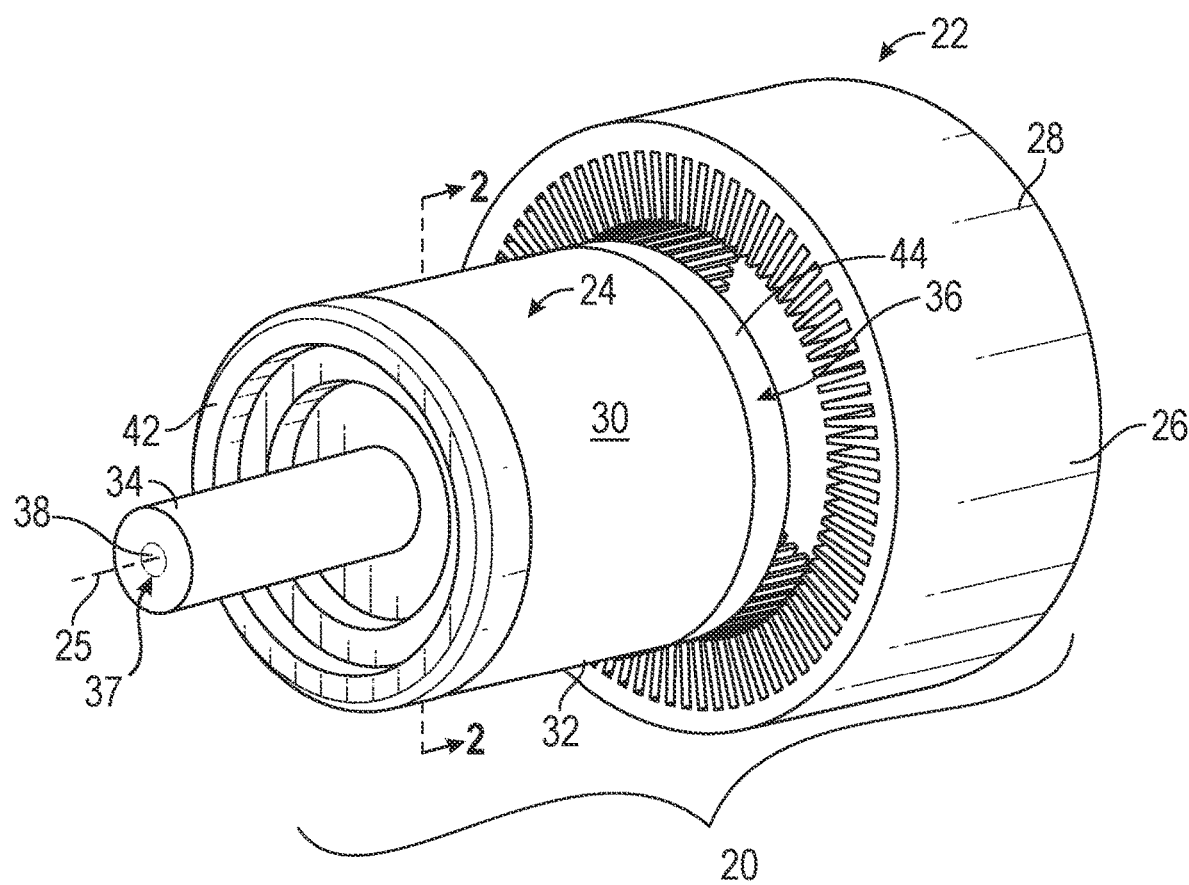
FIG. 1 is a schematic illustration of parts of an electric machine, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, rotors include cooling system features that include a heat pipe network that may have heat pipes placed inside the rotor without altering or interfering with the rotor's magnetic design. Heat is extracted from inside the rotor by the heat pipe evaporators and transported to at least one condenser by the heat pipe working fluid. The working fluid transfers the heat collected from the rotor to the condenser(s). The heat may be dissipated from the condenser(s) through oil or air cooling. In a number of embodiments, the rotor is an assembly that includes a steel lamination stack, end rings, and a heat pipe network, all mounted on a common shaft. The heat pipes may conform to the rotor cavities which are in place for magnetic design purposes, or may be placed in their own cavities nearby the magnetic elements. A condenser resides on the shaft, supporting and containing the lamination stack. The evaporators themselves may lock into the lamination stack to reduce mechanical stresses carried by the steel and/or to reduce the size of the existing structural portions of the laminations.

The cooling system may be configured to provide heat extraction paths next to/near the sources of the electromagnetic field in the rotor, which may be permanent magnets or electrical conductors, either of which may be temperature sensitive. The heat pipe evaporator and condenser network may be part of a cooling system that includes a liquid cooling system, or may be configured without additional liquid cooling. When included, a liquid cooling system may define a circuit through the rotor and that also cools the motor's stator. In embodiments, when the heat pipe network is included with a liquid cooling system, for efficiency liquid flow may be initiated only when the rotor losses exceed the ability of the heat pipes to remove the generated heat. The heat pipe network's condenser(s) may include the condensing functionality and may be configured as a structural integration with metallic end rings that provide support for the rotor's lamination stack. As a result, the condenser may provide end-ring functionality for rotor balancing and axial retention, thus eliminating the need for a separate end ring. The evaporators are mechanically supported on at least one side by the condenser. The heat pipe evaporators may interlock with the laminations to provide additional structural support for the lamination stack. To facilitate assembly of the rotor, the heat pipe evaporators may be pre-assembled to the condenser and readily inserted into the rotor stack with the condenser serving as the end ring. The heat pipe construction may be configured with a number of individual evaporators using a common condenser, where the working fluid in the heat pipe network is separately contained in each individual heat pipe evaporator. In some embodiments, two condensers may be included, one on each end of the rotor, with heat pipes extending toward the rotor's center from each end of the rotor. The heat pipe evaporators may be designed with features to promote heat transfer between the condenser and the evaporator and that use centrifugal forces to move the working fluid, which beneficially avoids a need for wicks or other capillaries inside the heat pipe. The condenser may have a shaped profile to improve heat transfer from the condenser to the cooling oil, when included.

Referring to FIG. 1, schematically illustrated are select components of an electric machine 20 including a stator assembly 22, and a rotor assembly 24 that is configured to rotate about an axis 25 through interaction with the stator 22. In the illustration, the rotor assembly 24 is shown moved outside the stator assembly 22 for visibility. In this embodiment, the electric machine 20 is configured as a motor in which the current in the rotor assembly 24 that produces torque is induced from the magnetic field created by energization of the stator assembly 22. In a number of embodiments, the electric machine 20 is an alternating current machine suitable for use in applications requiring regulated speed control such as for a vehicle traction motor, although this disclosure is not limited to those applications.

The stator assembly 22 is a generally annular shaped component, which may be constructed for single-phase power or multiple phase power such as, three-phase. In this embodiment, the stator assembly 22 includes a core 26 made of a lamination stack 28. The lamination stack 28 may be formed by stampings that are slotted to receive windings (not shown), and are made of a soft magnetic material such as silicon steel. The individual laminations in the lamination stack 28 may be insulated from one another by a thin non-conductive coating. In other embodiments, another ferromagnetic material may be used to construct the lamination stack 28. The stator assembly 22 may include the aforementioned windings for energization.

The rotor assembly 24 includes a core 30 which includes a lamination stack 32, and is configured to receive a shaft 34. The laminations in the lamination stack 32 may be stamped or otherwise formed, and are made of a ferromagnetic material and may be insulated from one another by a thin non-conductive coating, or may be made of another material. End rings 42, 44 are formed at the ends of the core 30 containing the lamination stack 32 on the shaft 34 and providing support therefor. In the current embodiment, the end rings 42, 44 are fabricated of an aluminum material for light weight and to provide structural integrity. One or both of the end rings 42, 44 may provide a number of functions including operating as a condenser in a cooling system 36, which is described in more detail below. In a number of embodiments, the cooling system 36 may also include a circulating liquid cooling system 37, and may employ pumped oil as the liquid, which may enter the rotor assembly 24 through an opening 38 in the shaft 34. The rotor assembly 24 is configured with a number of poles to create the magnetic circuit of the rotor assembly 24, which uses the angular position of the rotor assembly 24 for interacting with the field induced by the stator assembly 22 of the electric machine 20. These poles may be created, at least in-part, by flux barriers as described below. The rotor's magnetic field may be generated by a magnetic element source such as permanent magnets or electrical conductors/coils.

Figure 2:
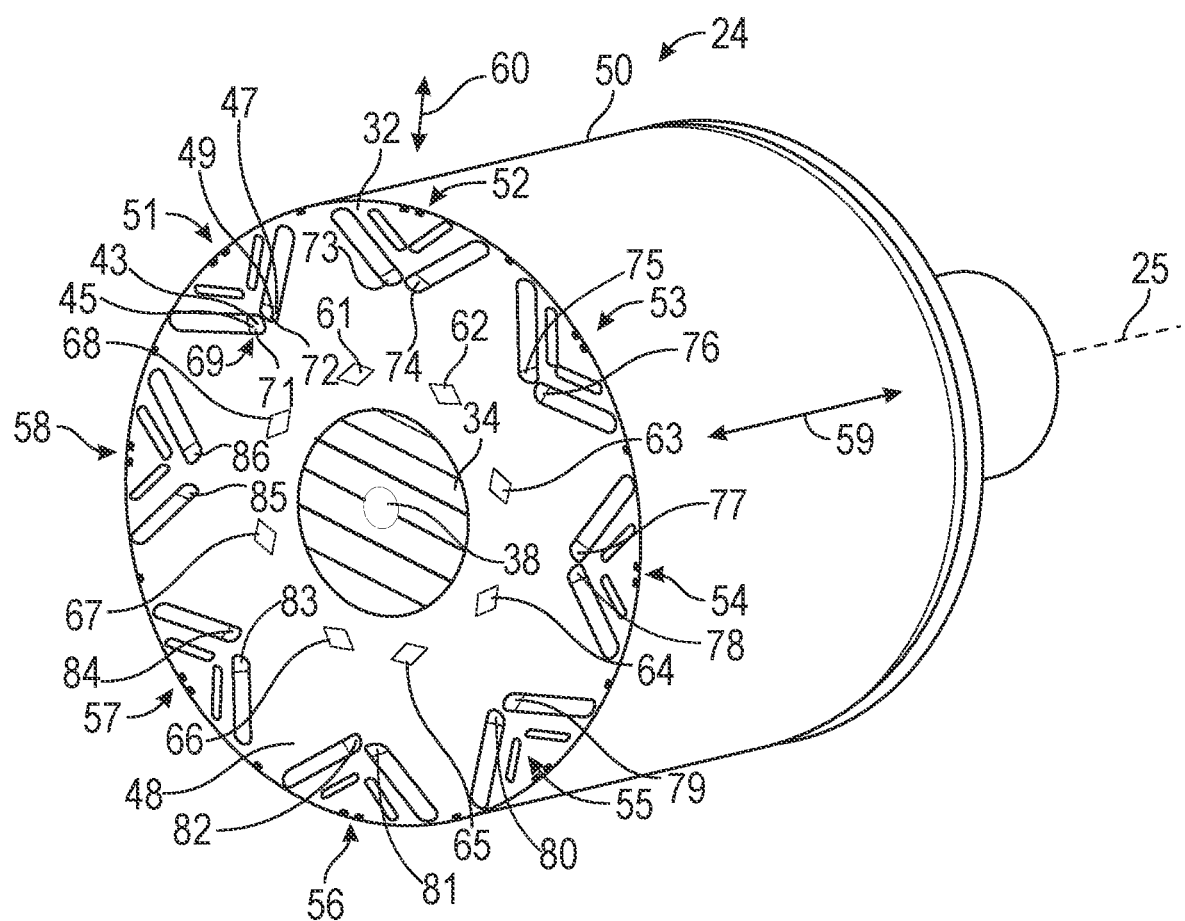
FIG. 2 is a fragmentary, cross sectional illustration of a rotor taken generally along the line 2-2 on the electric machine of FIG. 1, in accordance with various embodiments.

In FIG. 2, the rotor assembly 24 is shown in cross section with a side 48 of one of the laminations of the lamination stack 32 exposed and visible. Each lamination in the lamination stack 32 includes a number of openings, referred to as cavities, that may serve multiple purposes. Distributed around the rotor assembly 24 near its outer perimeter 50 are eight cavity groups 51-58, each formed in two angled layers.

The cavities in the cavity groups 51-58 extend through the rotor lamination stack 32 of the core 30 in an axial direction 59, which is parallel to the axis 25. The cavity groups 51-58 operate as barriers to magnetic flux and help define the magnetic poles of the rotor assembly 24. Some or all of the cavities in the cavity groups 51-58 may contain the magnetic element sources. For example, in cavity group 51, cavity 43 contains magnet 45, and cavity 47 contains magnet 49. In the current embodiment, the rotor assembly 24 has eight poles defined by the cavity groups 51-58. The rotor assembly 24 also includes a layer of channels 61-68 arrayed to encircle the shaft 34 and which are disposed part-way between the shaft 34 and the cavity groups 51-58 in the radial direction 75. The channels 61-68 may serve functions in the magnetic design of the rotor assembly. In the current embodiment, the channels 61-68 carry cooling oil as part of the cooling system 36, which enters the rotor assembly 24 through the opening 38.

The cooling system 36 includes a heat pipe cooling system 69 with heat pipe evaporators 71-86 contained in the radially inboard cavity layers of the cavity groups 51-58, including the cavities 43, 47. When the rotor assembly 24 rotates at very high speeds, stress due to centrifugal force or excitation force may concentrate at a portion of the rotor containing the magnetic elements, such as magnets 45, 49. In addition, certain rotor eddy current losses may be caused by the existence of the cavities, such as the cavities 43, 47. Accordingly, placing the heat pipe evaporators 71-86 in the cavities both targets a particular area of heat generation where the heat is beneficially removed at the source, and provides the ability to support the laminations of the lamination stack 32 through the structure of the heat pipe evaporators 71-86.

Figure 3:
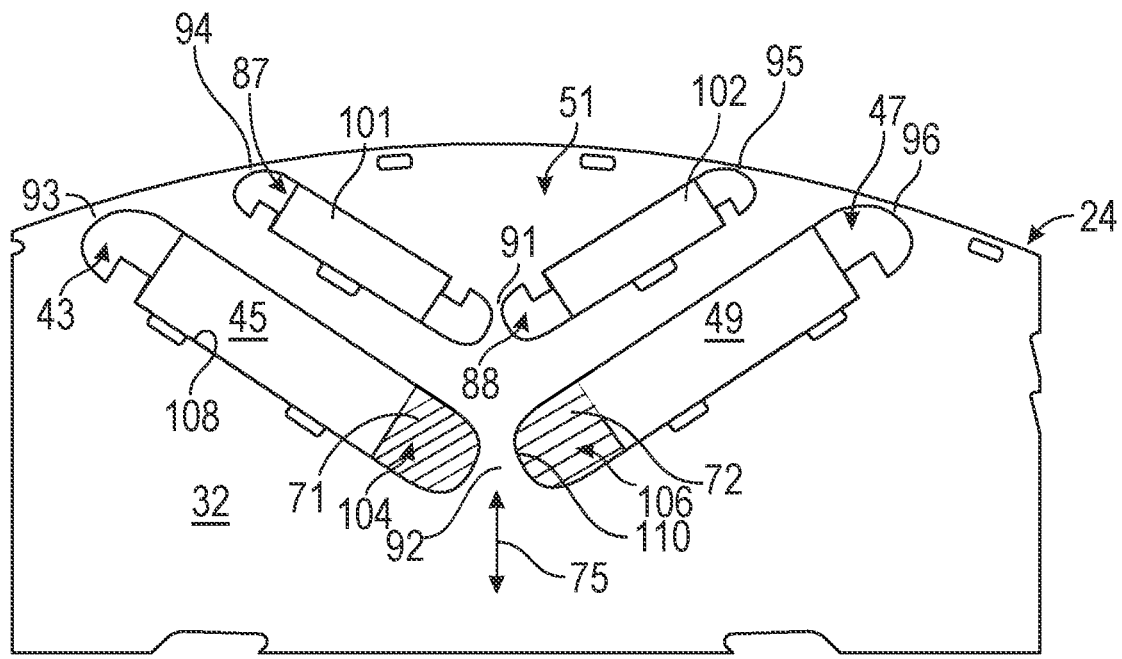
FIG. 3 is fragmentary illustration of part of the lamination stack at the section of FIG. 2, in accordance with various embodiments.

Referring to FIG. 3, an area of the rotor assembly 24 around the cavity group 51 is illustrated at an exposed lamination of the lamination stack 32. Each of the cavity groups 51-58 is similar and the details of cavity group 51 will be described with the understanding that the other cavity groups 52-58 include like elements. The cavity group 51 includes two layers of flux barriers, which in the current embodiment of an IPM motor are referred to as the cavities. The radially outward layer includes cavities 87, 88 and the radially inner layer includes the cavities 43, 47. The cavities 43, 47, 87, 88 define structural features of the remaining steel of the laminations of the lamination stack 32 in the form of struts 91, 92 and bridges 93-96. The struts 91, 92 and the bridges 93-96 hold the outer sections of the laminations of the lamination stack 32 together against rotationally induced forces during operation of the electric machine 20 and as such, may be subject to stresses. In the radially inner layer, the cavity 43 contains the magnet 45 and the cavity 47 contains the magnet 49. In the radially outer layer, the cavity 87 contains a magnet 101 and the cavity 88 contains a magnet 102. Each of the magnets 45, 49, 101, 102 extends in the axial direction 59 through its respective cavity and may be shaped like a bar with a rectangular cross section that has an extending length between the end rings 42 and 44.

In the cavity 43, a void 104 is defined between the magnet 45 and the wall 108 of the cavity 43. The heat pipe evaporator 71 is disposed in the void 104 and conforms to the wall 108 and to the magnet 45 completely filling the void 104 and making contact with the lamination stack 32 and the magnet 45. Similarly, in the cavity 47 a void 106 is defined between the magnet 49 and the wall 110 of the cavity 47. The heat pipe 72 is disposed in the void 106 and conforms to the wall 110 and to the magnet 49, completely filling the void 106 and making contact with the lamination stack 32 and the magnet 49. The heat pipe evaporators 71, 72 take advantage of the available space in the voids 104, 106 and therefor, do not interfere with magnetic design of the lamination stack 32 while providing a heat transfer path next to the temperature sensitive magnets 45, 47. In addition, the heat pipe evaporators 71, 72 provide additional structural support for the lamination stack 32 and expands the flexibility in designing the magnetic elements, such as by enabling use of a thinner strut 92.

Figure 4:
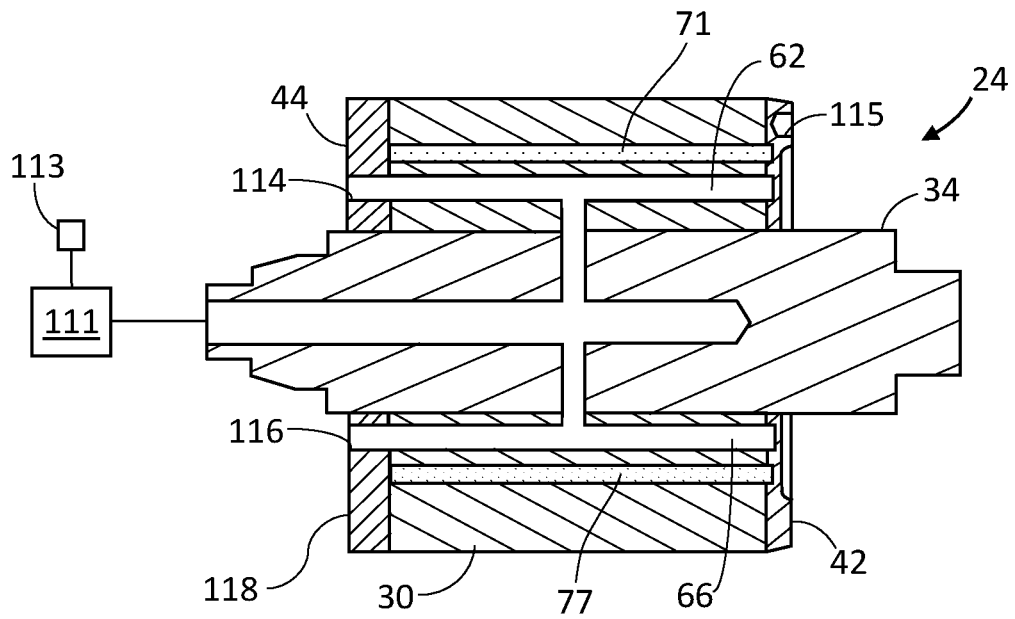
FIG. 4 is a schematic, sectional view of the rotor of FIG. 1 with one condenser, in accordance with various embodiments.

As shown in FIG. 4, the rotor assembly 24 includes the cooling system 36, which has the liquid cooling system 37 and the heat pipe cooling system 69, each extending into the core 30. The rotor assembly 24 includes the core 30, end rings 42, 44 and the shaft 34, with the end ring 44 configured as a condenser. The multi-function condenser end ring 44 provides support and containment functions of an end ring, along with a condenser function of the heat pipe network. As such, the condenser end ring 44 enables balancing the rotor assembly 24, such as by the select removal of material forming voids 115, without impacting the condenser functions. The liquid cooling system 37 includes a pump 111 that delivers a fluid, such as oil through the opening 38, which extends axially through the shaft 34. In embodiments such as a vehicle propulsion system, the pump 111 may pump fluid for lubrication and cooling purposes of the propulsion system including for the electric machine 20 and may be variably controlled such as by a controller 113. Control of the oil flow may be employed to reduce flow, drag and/or pumping effort such that during low power states of operation and/or when the drag is high, reduced pumping may be provided which increases efficiency while the heat pipe network removes all or a majority of the generated heat. At least one cross bore 112 extends radially through the opening 38 to the channels 61-68, such as to the channels 62, 66 as shown. The channels 62, 66 extend axially through the core 30 penetrating the condenser end ring 44 and extending to but not through the end ring 42. Oil may exit the rotor assembly 24 through the condenser end ring 44 at openings 114, 116, wetting the exterior surface 118 for cooling. Rotation of the rotor assembly 24 causes the oil to flow across the surface 118 in a radially outward direction and then to be distributed onto the stator 22 for cooling thereof.

The heat pipe cooling system 69 includes the heat pipe evaporators 71-86 including the heat pipe evaporators 71, 77 as shown. The heat pipe evaporators 71-86 may be fixed to the condenser end ring 44 forming an integrated subassembly, prior to insertion into the core 30. The heat pipe evaporators extend axially through the core 30 to the end ring 42 locking into the rotor lamination stack 32 to reinforce the rotor providing added mechanical integrity, such as for high-speed operation. The locking action may be effected by means such as a press fit or due to in-site curing of the heat pipe evaporators 71-86 which conform to the available space. The cooling provided by the heat pipe cooling system 69 is a function of factors such as working fluid flow and temperature of the rotor assembly 24. The evaporators 71-86 are closed pipes within which the working fluid circulates between the lower temperature condenser end ring 44 and the higher temperature section within the core 30, where heat is generated during operation of the electric machine 20. As temperatures rise, evaporative cooling is effected as the working fluid evaporates in the evaporators 71-86 absorbing thermal energy for transport to the condenser end ring 44, where the working fluid returns to a liquid state and flows back to the higher temperature areas.

Figure 5:
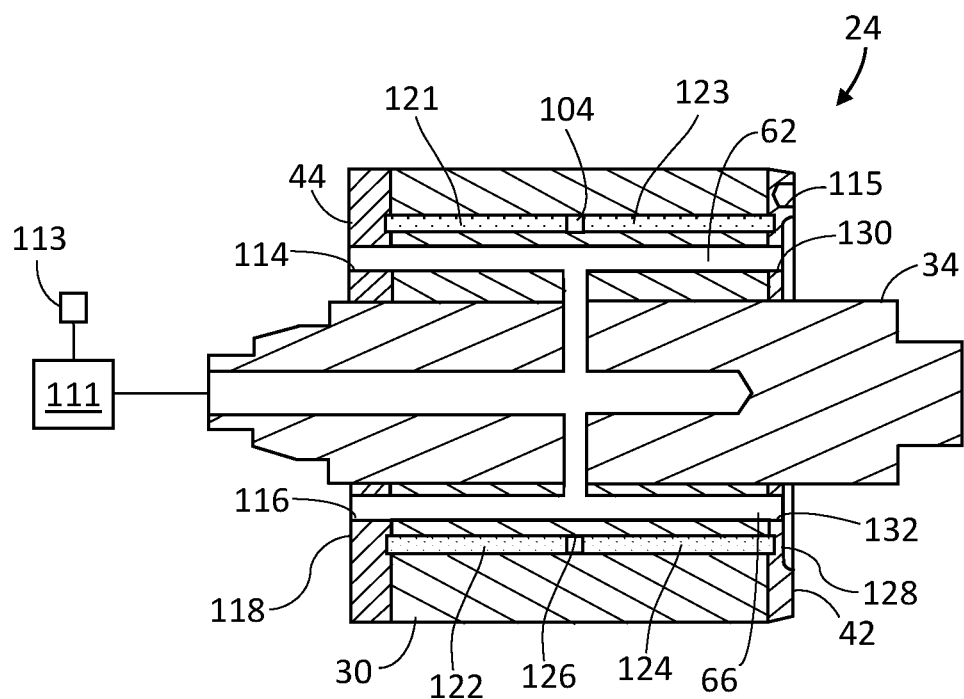
FIG. 5 is a schematic, sectional view of the rotor of FIG. 1 with two condensers, in accordance with various embodiments.

As illustrated in FIG. 5, the cooling system 36 includes the liquid cooling system 37 as in FIG. 4 and includes a heat pipe cooling system 120 with two condenser end rings 42, 44. The heat pipe evaporators 121-124 are representative of a number of evaporators extending bi-directionally into the core 30. The heat pipe evaporators 121, 122 are coupled with the condenser end ring 44 and the heat pipe evaporators 123, 124 are coupled with the condenser end ring 42. The length of the heat pipe evaporators 121-124 is a parameter in the amount of heat that may be removed from the rotor assembly 24. The lengths may be adjusted depending on the heat removal requirements. The heat pipe evaporators 121-124 may extend less than halfway through the core 30 as shown, or may extend more than halfway through the core 30. When extending more than halfway through the core 30, the heat pipe evaporators 121, 123 for example, may be offset form each other so as to not intersect and may overlap in the axial direction. In the currently illustrated embodiment, the heat pipe evaporators 121, 123 for example, are disposed in a common void 104 to not require modification of the magnetic design. Similarly, the heat pipe evaporators 122, 124 are disposed in a common void 126 of one of the cavities. In this embodiment, the liquid cooling system 37 cools the outer surfaces 118, 128 of both condenser end rings 42, 44 through openings 114, 116 130, 132.

Figure 6:
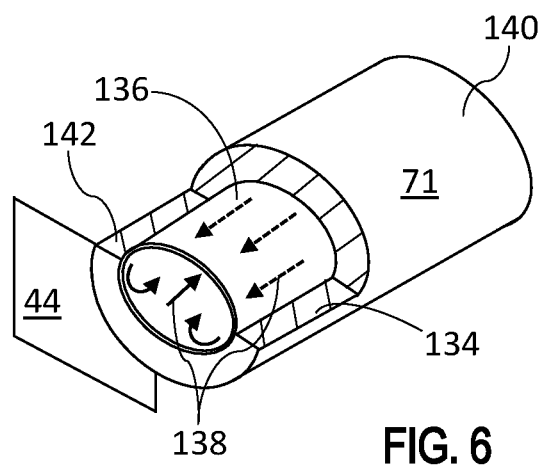
FIG. 6 is a fragmentary, sectional, schematic illustration of a heat pipe of the rotor of FIG. 1, in accordance with various embodiments.

Referring to FIG. 6, an example construction of the heat pipe evaporator 71 is illustrated as a representative of the heat pipe evaporators 71-86. The heat pipe evaporator 71 generally includes a case 134, a capillary 136 and a working fluid 138 that transforms between vapor and liquid states for heat movement. In one section 140, heat generated in the core 30 is transferred to the working fluid 138 evaporating the liquid, and absorbing the heat into the vapor. By the creation of the additional vapor, the vapor flows to the other section 142 at the condenser end ring 44 where it condenses, delivering the heat to the condenser end ring 44. The condensed liquid moves back toward the section 140 by capillary action completing the cycle. The case 134 may be conformal to the void within which it is inserted, such as the void 104. For example, the case 134 may be made of a ceramic resin, which may be printed by additive manufacturing, or otherwise formed, and then cured, such as by heat of ultraviolet light for strength. The case 134 may be cured in-situ in the void 104, or may be cured in a form modeled on the void 104 and then inserted into the void 104. The capillary 136 may be of a number of constructions and in the current illustration is a ceramic wick that may be formed by powder sintering. The capillary 136 may be formed prior to the case 134, which may be constructed on the capillary 136, or the capillary 136 may be constructed and inserted into a formed case 134. The working fluid 138 may be a dielectric fluid to avoid creating electromagnetic losses in the rotor assembly 24. In other embodiments, the capillary 136 may be another structure that is compatible with moving the working fluid 138, such as grooves, passages, heat pipe shapes or others. In general, the working fluid 138 in a vapor state and its associated latent heat, moves toward the lower temperature condenser section 142 where it condenses releasing heat. Action of the capillary 136 moves the working fluid 138 as condensed liquid back to through evaporator 71 through the capillary structure.

Figure 7:
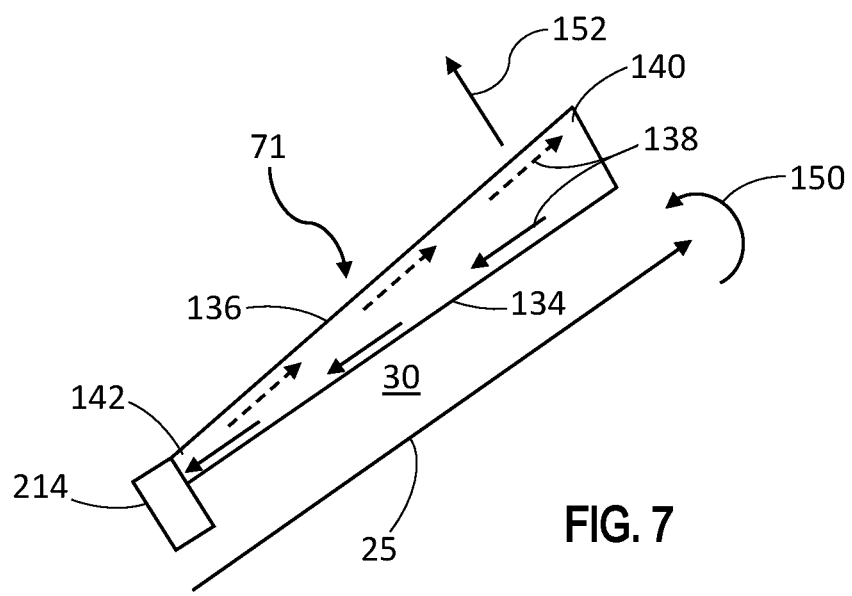
FIG. 7 is a schematic illustration of a tapered heat pipe for the rotor of FIG. 1, in accordance with various embodiments.

Referring to FIG. 7, the shape of the heat pipe evaporator 71 as a structure of the capillary 136 is illustrated. In this embodiment, the case 134 of the heat pipe evaporator 71 is tapered to have a smaller cross sectional area of the section 142 at the condenser end ring 44 and an increasingly larger cross sectional area moving away from the condenser end ring through the section 140. Rotation 150 of the rotor assembly 24 about the axis 25 creates a centrifugal force 152 acting on the heat pipe evaporator 71. The tapered shape of the case 134 promotes flow of the liquid form of the working fluid 138 from the condenser end ring 44 through the case 134 and into the core 30 under the influence of the centrifugal force 152. The more-dense liquid form of the working fluid 138 moves along the radially outer side of the case 134. The less-dense vapor form of the working fluid 138 moves back toward the condenser end ring 44 along the radially inner side of the case 134. Employing a taper shape of the case 134 as the capillary 136 may be used to eliminate the need for a separate wick-type component.

Figure 8:
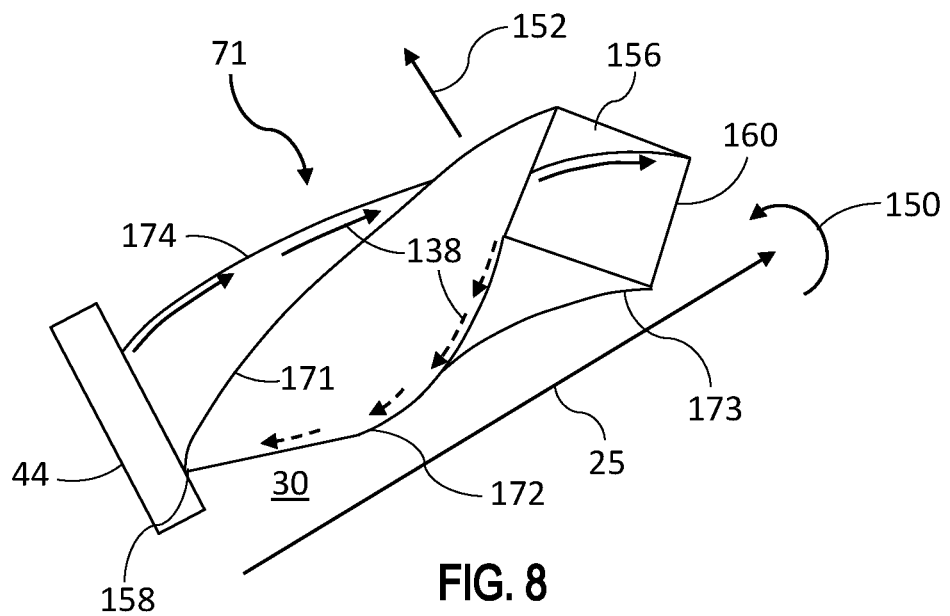
FIG. 8 is a schematic illustration of a twisted heat pipe for the rotor of FIG. 1, in accordance with various embodiments.

Referring to FIG. 8, another shape of the heat pipe evaporator 71 as a structure of the capillary 136 is illustrated. In this embodiment, the case 134 of the heat pipe evaporator 71 is formed in a twisted shape to have a consistent and rotating cross sectional area. The cross section 156 of the case 134 is generally quadrilateral in shape and twists ninety-degrees from the end 158 at the condenser end ring 44 to the end 160 in the core 30. The cross section 156 forms corners 161-164 with a twisting/spiraling orientation along the length of the case 134. Rotation 150 of the rotor assembly 24 about the axis 25 creates the centrifugal force 152 acting on the heat pipe evaporator 71. The twisted shape of the case 134 promotes flow of the liquid form of the working fluid 138 from the condenser end ring 44 through the case 134 and into the core 30 under the influence of the centrifugal force 152. The case has four corner lines 171-174, twisted along its length. At the end 158, the corner lines 172 and 172 are equally distant from the axis 25. At the end 160, the corner line 171 is the radially most distant of the corner lines 171-174 from the axis 25. As such, the corner line 171 progressively moves away from the axis 25 when moving into the core 30. The more-dense liquid form of the working fluid 138 moves, generally along the twisted corner line 171 of the case 134. The less-dense vapor form of the working fluid 138 moves back toward the condenser end ring 44 generally along the corner line 172 of the case 134. Employing a twisted/spiraling shape of the case 134 as the capillary 136 may be used to eliminate the need for a separate wick-type component.

Figure 9:
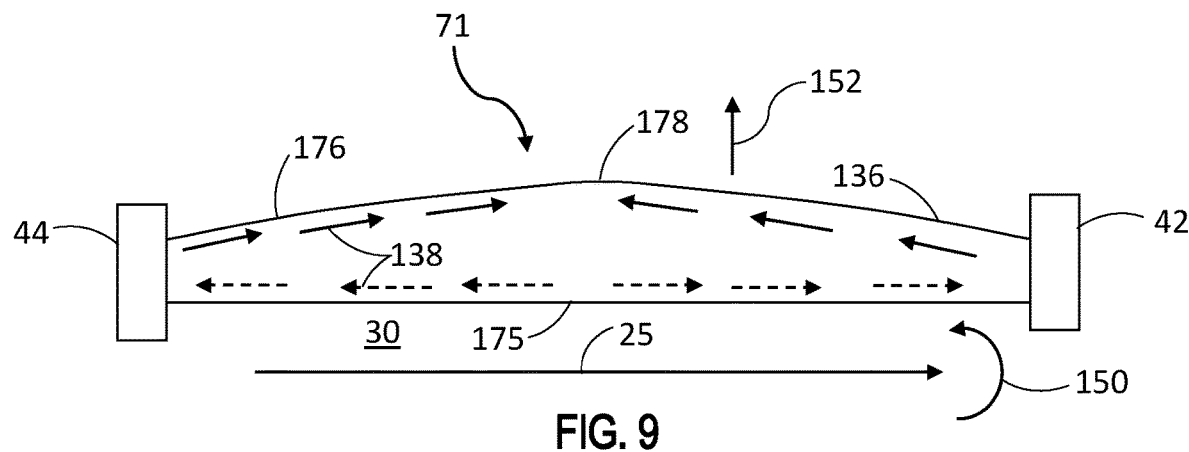
FIG. 9 is a schematic illustration of an arched heat pipe with two condensers for the rotor of FIG. 1, in accordance with various embodiments.

Referring to FIG. 9, the shape of the heat pipe evaporator 71 as a structure of the capillary 136 is illustrated with dual condenser end rings 42, 44. In this embodiment, the case 134 of the heat pipe evaporator 71 has a flat radially innermost wall 175 and an arching radially outermost wall 176 from the condenser end ring 44 to the condenser end ring 42. The case 134 forms a unitary heat pipe with an open interior from the condenser end ring 44 to the condenser end ring 42. The case 134 has smaller cross sectional areas at the condenser end rings 42, 44 and an increasingly larger cross sectional area moving away from the condenser end rings 42, 44 toward the midpoint 178 between the condenser end rings 42, 44. At the midpoint 178, the radially outermost wall 176 has arced radially outward to be at its furthest point from the axis 25. Rotation 150 of the rotor assembly 24 about the axis 25 creates a centrifugal force 152 acting on the heat pipe evaporator 71. The arched/arcing shape of the radially outermost wall 176 of the case 134 promotes flow of the liquid form of the working fluid 138 from the condenser end ring 44 through the case 134 and into the core 30 under the influence of the centrifugal force 152. The more-dense liquid form of the working fluid 138 moves along the radially outer side of the case 134. The less-dense vapor form of the working fluid 138 moves back toward the condenser end ring 44 along the radially inner side of the case 134. Employing an arched/arcing shape of the case 134 as the capillary 136 may be used to eliminate the need for a separate wick-type component. The optimum arched shape/curvature of the radially outermost wall 176 may be configured for maximum heat transfer by increasing liquid flow out through the evaporator 71.

Figure 10:
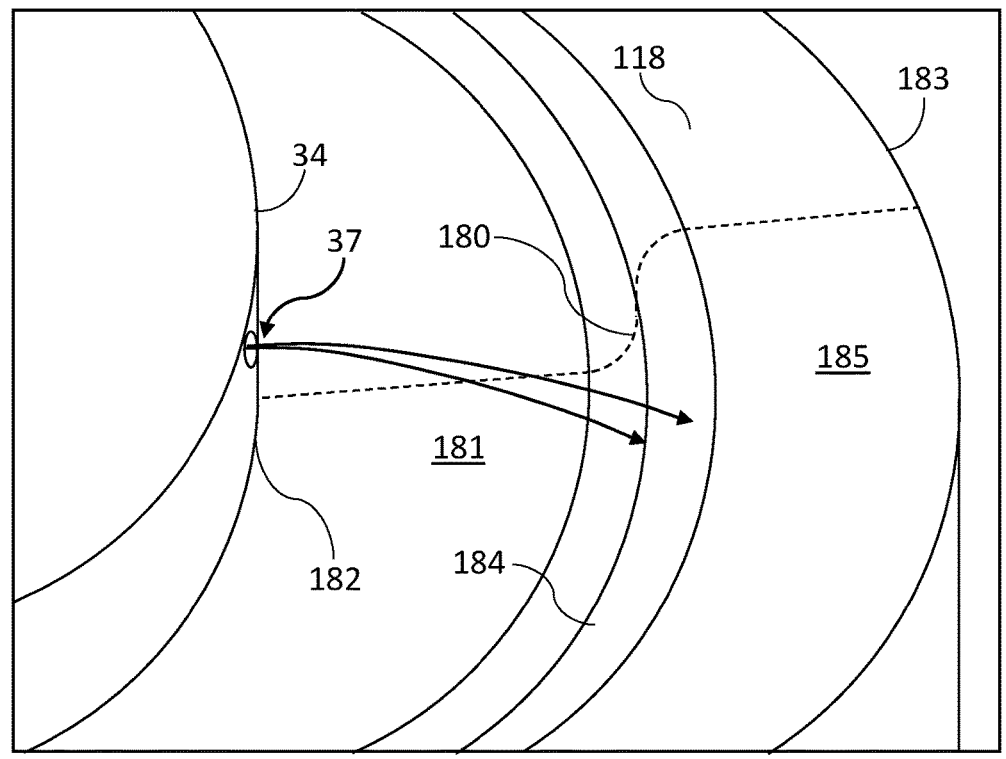
FIG. 10 is a schematic, perspective illustration of the end ring of the rotor of FIG. 1, in accordance with various embodiments.

Referring to FIG. 10, the condenser end ring 44 is shown in perspective. The liquid cooling system 37 expels liquid onto the surface 118 of the condenser end ring 44 to remove heat (such as through the openings 114, 166 of FIG. 4). The profile 180 of the surface 118 is configured to optimize heat transfer. The profile 180 includes a flat section 181 starting at the shaft 34 or at the radially innermost edge 182 and moving radially outward. The surface 118, between the radially innermost edge 182 and the radially outermost edge 183, includes a dam 184 that rises axially outward from the section 181 creating resistance to fluid flow. From the dam 184 to the radially outermost edge 183, the surface includes a flat section 185 that is stepped axially outward from the flat section 181 in a direction away from the core 30. Flowing the fluid over the section 181, up and over the dam 184 and across the section 185 optimizes heat removal from the condenser end ring 44.

Accordingly, the rotor of an electric machine includes a core that may be formed by a stack of laminations with inner cavities forming a housing for the source of the electromagnetic field, such as permanent magnets or electrical conductors. Part of the cavities in the proximity of the electromagnetic field source may be occupied by heat pipe evaporators, which extend through the length of the rotor and are connected on at least one side to the rotor's end ring as a condenser. The evaporators may be connected at their opposite ends to a metallic end ring. The condenser end ring may function as the second end ring of the rotor providing a means for rotor balancing and rotor axial retention. In some embodiments, the rotor assembly may include two sets of heat pipe evaporators extending in from both ends with a condenser end ring at each of the ends. The heat pipe evaporators may be conformal and may lock into the rotor lamination stack to reinforce the rotor's mechanical integrity for high-speed operation. Oil flow in the electrical machine may also be employed to cool the condenser end ring(s) and oil flow may provide a rotor cooling loop in conjunction with the heat pipe cooling system. Control of the oil flow to the rotor and stator may be employed to reduce flow and drag or pumping effort such that over low power states of operation and/or when the drag is high, the heat pipe cooling system acts as the main path for heat transfer. Reduced oil pumping increases efficiency. The oil flow may be increased in correspondence with the amount of heat generated in the machine. The heat pipe evaporators may be configured as individual tubes using a common condenser/end ring. Fabrication of the rotor assembly may be structured so that the heat pipe is formed separately, coupled with the condenser end ring(s), and attached to a partially completed rotor assembly before balancing. The design of the heat pipe evaporators may leverage rotationally induced centrifugal force to effect capillary action, such as by employing a tapered shape, a twisting spiral shape, or a curved shape. The condenser end ring may include a stepped profile with a dam to improve the heat transfer to the cooling oil.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A rotor for an electric machine comprising:
a rotor core having at least one cavity internal to the rotor core, the at least one cavity surrounded by a wall defined by the rotor core;
a magnetic element disposed in the at least one cavity leaving a void in the at least one cavity between the magnetic element and the wall; and
a heat pipe evaporator disposed in the void and contacting the magnetic element and the wall to remove heat from the rotor core, wherein the heat pipe evaporator comprises a case and a working fluid in the case that is configured for heat movement, wherein the heat pipe evaporator conforms to the wall and to the magnetic element, filling the void.

2. The rotor of claim 1, wherein the magnetic element comprises a magnet.

3. The rotor of claim 1, comprising an end ring on the rotor core, the heat pipe evaporator coupled with the end ring as a condenser, wherein the end ring is configured to retain and support the rotor core.

4. The rotor of claim 1, wherein the heat pipe evaporator includes a capillary inside the case, wherein the capillary is configured to assist in moving the working fluid within the case through a wicking action.

5. The rotor of claim 4, wherein the rotor rotates about an axis, wherein the shape comprises at least one of tapered, twisted and arched, wherein tapered means to have a first cross sectional area at a condenser end ring and an increasingly larger cross sectional area as compared to the first cross sectional area moving away from the condenser end ring, wherein twisted means to have a consistent and rotating cross sectional area in a direction along the axis, and wherein arched means an increasingly larger cross sectional area moving away from the condenser end ring toward a midpoint though the rotor where the increasingly larger cross sectional area is maximized.

6. The rotor of claim 1, wherein:
the at least one cavity comprises one cavity,
the rotor core includes two axial ends,
the heat pipe evaporator comprises a first heat pipe evaporator that extends into the rotor core from a first of the two axial ends,
a second heat pipe evaporator extends into the rotor core from a second of the two axial ends, and
both of the first heat pipe evaporator and the second heat pipe evaporator extend into the one cavity.

7. The rotor of claim 1, wherein the heat pipe evaporator is configured to lock into the rotor core to reinforce the rotor.

8. The rotor of claim 1, comprising an end ring on the rotor core, wherein the heat pipe evaporator is coupled with the end ring as a condenser, wherein the end ring includes an outer surface with a dam forming a step, wherein the rotor has a liquid cooling system configured to direct liquid over the outer surface and over the dam to cool the condenser.

9. The rotor of claim 1, comprising a liquid cooling system for cooling the rotor core, wherein the liquid cooling system includes a pump configured with a controller to reduce fluid pumping for optimal efficiency while the heat pipe evaporator removes heat from the rotor core.

10. The rotor of claim 1, comprising an end ring on the rotor core, wherein the heat pipe evaporator is coupled with the end ring as a condenser, the heat pipe evaporator and the end ring forming a unitary assembly prior to inserting into the rotor core.

11. A rotor for an electric machine comprising:
a shaft;
a rotor core disposed on the shaft, the rotor core having a plural number of cavities internal to the rotor core, each one of the cavities defined by the rotor core forming walls of each cavity, the cavities configured as flux barriers to provide desirable magnetic properties of the rotor core;
a magnetic element disposed in at least some of the cavities leaving a void in each of the at least some of the cavities between the magnetic element and the wall;
a heat pipe evaporator disposed in at least some of the voids and contacting the respective magnetic element and the wall to remove heat from the rotor core;
an end ring disposed on the shaft and supporting the rotor core, the end ring coupled with each of the heat pipe evaporators as a condenser; and
a liquid cooling system for cooling the rotor core, wherein the liquid cooling system includes a pump configured with a controller to reduce fluid pumping with the heat pipe evaporator removing heat from the rotor core and to increase pumping when additional cooling is required.

12. The rotor of claim 11, wherein the magnetic elements comprise permanent magnets.

13. The rotor of claim 11, wherein the heat pipe evaporators each comprise a case configured with a shape to effect capillary action through a centrifugal force generated by rotation of the rotor.

14. The rotor of claim 11, wherein the heat pipe evaporators each comprise a case configured with a shape, wherein the shape comprises at least one of tapered, twisted and arched, and is configured to impart liquid flow through one part of the heat pipe evaporators and to impart vapor flow through another part of the heat pipe evaporators.

15. The rotor of claim 11, wherein:
the rotor core includes two axial ends,
the heat pipe evaporators comprise a first set that extends into the rotor core from a first of the two axial ends and a second set that extends into the rotor core from a second of the two axial ends.

16. The rotor of claim 11, wherein the heat pipe evaporators are configured to conform to the void and to lock into the rotor core to reinforce the rotor by means of being positioned within the voids.

17. The rotor of claim 11, wherein the end ring includes an outer surface with a dam forming a step, wherein the rotor has a liquid cooling system configured to direct liquid over the outer surface and over the dam to cool the condenser.

18. The rotor of claim 11, wherein the heat pipe evaporator comprises a case, a capillary in the case, and a working fluid in the case that is configured for heat movement, wherein the heat pipe evaporator conforms to the wall and to the magnetic element, filling the void.

19. The rotor of claim 11, wherein the cavities are distributed around the rotor core in sets, wherein each of the sets includes a radially outer layer of cavities and a radially inner layer of cavities, and wherein the heat pipe evaporators are disposed in the radially inner layer of cavities at radially innermost ends of the radially inner layer of cavities.

20. A rotor for an electric machine comprising:
a shaft;

a rotor core disposed on the shaft, the rotor core having a plural number of cavities internal to the rotor core, each one of the cavities defined by walls formed by the rotor core, the cavities configured as flux barriers to provide desirable magnetic properties of the rotor core;

a magnetic element disposed in at least some of the cavities leaving a void in each of the at least some of the cavities between the respective magnetic element and the walls;

a heat pipe evaporator disposed in at least some of the voids and contacting the magnetic element and the wall to remove heat from the rotor core; and an end ring disposed on the shaft and supporting the rotor core, the end ring coupled with each of the heat pipe evaporators as a condenser, the condenser and the heat pipe evaporators forming a unitary subassembly unit, wherein the end ring includes an outer surface with a dam forming a step, wherein the rotor has a liquid cooling system configured to direct liquid over the outer surface and over the dam to cool the condenser.

* * * * *